United States Patent [19]
Oyaizu

[11] Patent Number: 5,823,512
[45] Date of Patent: Oct. 20, 1998

[54] GAS SPRING

[75] Inventor: Hiroshi Oyaizu, Shizuoka, Japan

[73] Assignee: Showa Corporation, Gyoda, Japan

[21] Appl. No.: 760,781

[22] Filed: Dec. 5, 1996

[30] Foreign Application Priority Data

Dec. 6, 1995 [JP] Japan .................................. 7-344395
Mar. 14, 1996 [JP] Japan .................................. 8-084545

[51] Int. Cl.⁶ ........................................................ F16F 5/00
[52] U.S. Cl. ................................ 267/64.12; 188/322.17; 267/64.15
[58] Field of Search ............................ 267/64.12, 64.15, 267/120; 188/300, 322.17, 322.18, 322.19, 296; 92/222, 223

[56] References Cited

U.S. PATENT DOCUMENTS

| 4,066,279 | 1/1978 | Kaptanis ................................ 280/711 |
| 4,161,241 | 7/1979 | Larson .................................... 188/298 |
| 4,166,522 | 9/1979 | Bourcier De Carbon .............. 188/287 |
| 4,595,182 | 6/1986 | Freitag et al. . |
| 4,909,488 | 3/1990 | Seibert et al. ....................... 267/64.11 |

FOREIGN PATENT DOCUMENTS 1577079  10/1980  United Kingdom .

OTHER PUBLICATIONS

Japanese Unexamined Patent Publication No. 53–1764.
Japanese Unexamined Patent Publication No. 54–112439.
Japanese Unexamined Utility Model Publication No. 3–75327.

Primary Examiner—Robert J. Oberleitner
Assistant Examiner—Pamela J. Lipka
Attorney, Agent, or Firm—Dvorak & Orum

[57] ABSTRACT

There is provided a gas spring 20 in which: a cylinder groove 29 is formed on an inner surface of a cylinder 21 with a piston 23 therein, the piston 23 being fixed at one end of a rod 22 and the cylinder groove 29 extending in an axial direction of the cylinder throughout the range of piston stroke except an area near a stopper 30; and an airlock chamber is definable nearby the stopper of the cylinder so that damping operation can be performed when being fully extended at the end of the extending phases, the piston being formed of a porous material to communicate air between chambers provided at both sides of the piston.

3 Claims, 10 Drawing Sheets

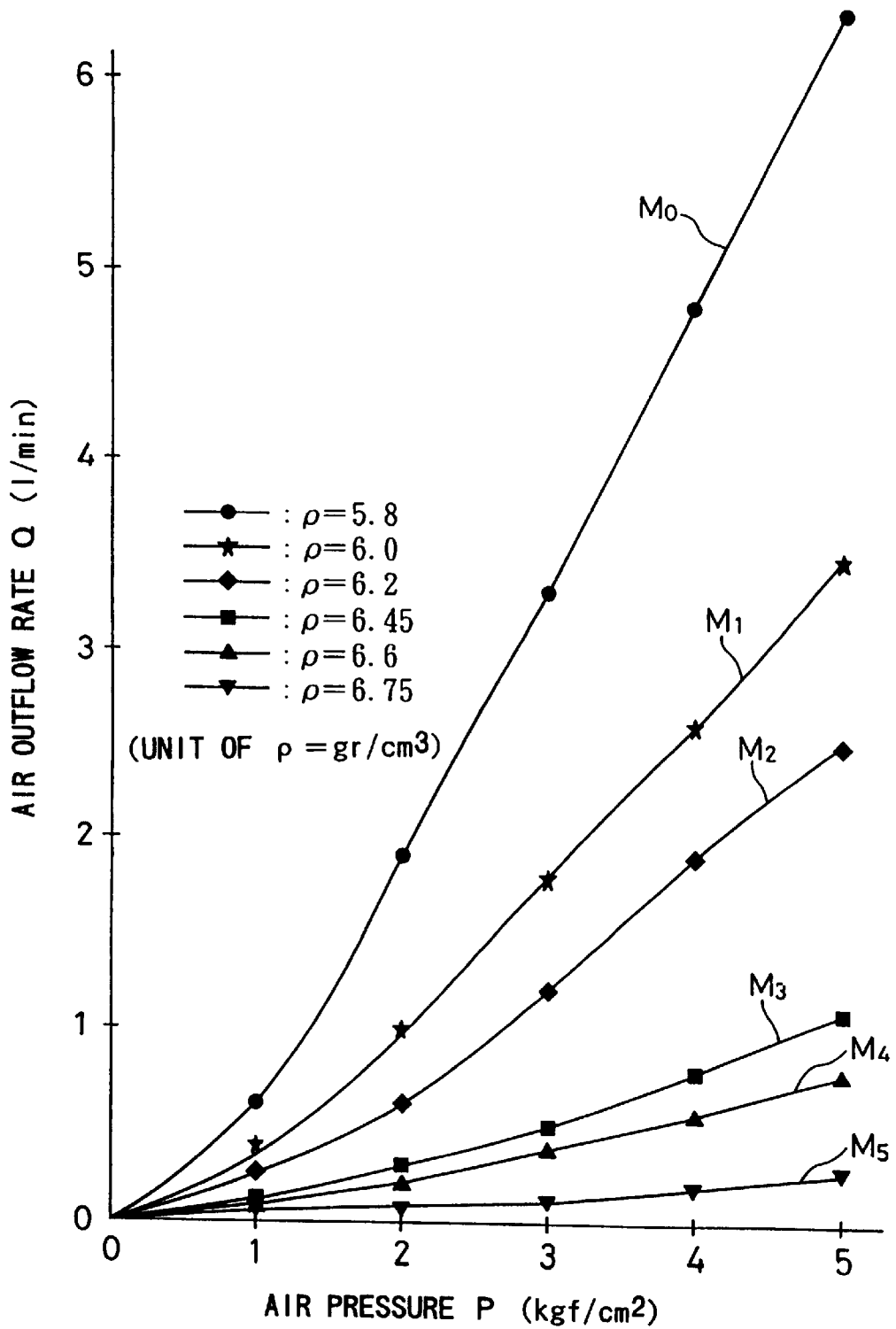

GAS SPRING

BACKGROUND OF THE INVENTION

1. Field of the Invention

This invention relates to a gas or pneumatic spring used in a back hatch door or trunk lid of a four-wheel vehicle or the like.

2. Discussion of the Background Art

A four-wheel vehicle generally has back hatch doors, each capable of opening and closing along or around a horizontal axis of the car body. The back hatch door is mounted onto the car body through a gas spring so that a force required for opening the door can be reduced by an assisting force of the gas spring.

One of often used gas springs is an inverted gas spring, which is configured to locate a cylinder at the upper side and a rod at the lower side when the door is closed. The inverted gas spring is classified into two types, depending on the method of mounting the gas spring between the back door and the car body. One is an inverted force type shown in FIGS. 14A to 14C of the drawings and the other is an inverted position turning type shown in FIGS. 15A and 15B.

In a gas spring 1 of inverted force type shown in FIGS. 14A to 14C, which is mainly used in a back hatch door of four-wheel vehicles such as a station wagon, a cylinder 3 is attached to the back hatch door 2 and a rod 4 is attached to the car body so as to keep the cylinder 3 and the rod 4 substantially in a vertical position. In this case, the cylinder 3 and the rod 4 do not change their position in either open or close state of the door 2.

In a gas spring 1 of inverted position turning type shown in FIGS. 15A and 15B, which is used in a back hatch door 2 of four-wheel vehicles such as a passenger car, the cylinder 3 is attached to the car body and the rod 4 is attached to the door 2 so as to position the gas spring at an angle when the back hatch door 2 is closed. In this case, the cylinder 3 and the rod 4 turn their position between open and closed states of the hatch door 2.

These inverted type gas springs 1 have been widely used due to an excellent sealing property whereas a gas 5 can be enclosed tightly within the cylinder 3. The gas 5 is enclosed within the cylinder 3 together with a small amount of oil 6. In the inverted gas spring 1 of FIGS. 14A to 14C, the oil 6 remains in the lower portion of the cylinder 3 when the hatch door 2 is closed, and a gas seal 7 arranged in the lower opening is lubricated properly with the oil 6, so that the gas 5 enclosed within the cylinder 3 can be sealed by the gas seal 7.

As shown in FIG. 16A with the above inverted gas spring 1, during compression processing for the gas spring 1, the gas 5 enclosed in a piston-side chamber 8A flows into a rod-side chamber 8B through an outer passage 10 around a piston 9 and an orifice 11, so that little or no damping force is generated, thereby closing the back door 2 quickly.

FIG. 16B shows the process of extending the gas spring 1, in which an outer piston-ring 12 around the piston 9 blocks the outer passage 10, and thereby the gas 5 within the rod-side chamber 8B flows into the piston-side chamber 8A only through the orifice 11 of the piston 9, so that extension damping force occurs. In the process of extending the gas spring 1, although extension assisting force acts on the rod 4, the assisting force being caused by the gas spring 1 by pressure of the enclosing gas 5 in the cylinder 3 (reaction force of the gas), the transit speed (or extension speed) of the rod 4 is controlled by the extension damping force to push up the hatch door 2 at a desired speed.

Further, FIG. 14C shows a state of the gas spring 1 when the gas spring 1 has been fully extended at the end of the extending process, in which the oil 6 within the cylinder 3 flows through the orifice 11 of the piston 9 to produce large damping resistance. The fully extended gas spring 1 is thereby damped.

As discussed above, the use of the oil 6 to perform the damping operation when being fully extended does not cause any problems for the gas spring 1 of inverted force type shown in FIGS. 14A to 14C, whereas the following problems (1) through (4) are present in the gas spring 1 of inverted position turning type shown in FIGS. 15A and 15B.

(1) Since the cylinder 3 and the rod 4 turn their position to locate the cylinder 3 at the lower side and the rod 4 at the upper side as the hatch door 2 is opened, the oil 6 within the rod-side chamber 8B enters near the turned position and flows through the orifice 11 of the piston 9 into the piston-side chamber 8A. Thereby the rod-side chamber 8B is put into an oil deficient state in a full extension area. As a result, the gas spring 1 can not be damped sufficiently, and a problem arises since the piston 9 sharply collides with the opening end of the cylinder 3 to carry vibrations to the car body.

(2) When the back door 2 is opened again after closing the hatch door 2 to a position slightly above the turned position, the oil 6 moves to the piston-side chamber 8A and the rod-side chamber 8B is put into an oil deficient state. As a result, the gas spring 1 can not be damped sufficiently when fully extended, and therefore the same problem arises in that the piston 9 sharply collides with the opening end of the cylinder 3.

(3) When the hatch door 2 is opened, the oil 6 within the rod-side chamber 8B enters near the turned position and starts flowing toward the pistonside chamber 8A, so that the oil 6 flows through the orifice 11 to increase the gasflow resistance, and hence the extension damping force. This causes slow-down of the extending operation of the rod 4 and the opening operation of the door 2.

(4) Since the oil 6 passing through the orifice 11 affects the extension damping force, the extension damping force may vary with various conditions, such as enclosed amount of the oil 6, temperature of oil 6, position of the gas spring 1, and reaction force of the enclosed gas 5.

To solve the above problems, Japanese Patent Laid-Open Application (JP-A) No. 53-1764 (first prior art) discloses a gas spring 13, as shown in FIG. 17, which is damped due to an action of only a gas (air) when being fully extended. The gas spring 13 encloses a very small amount of oil 6 to lubricate the gas seal 7 only. The gas spring 13 includes: cylinder grooves 15, which are formed in an axial direction of a cylinder 14 by notching the inner surface of the cylinder 14 so that the piston-side chamber 8A and the rod-side chamber 8B can communicate with each other; and an inner orifice 17A and an outer orifice 17B passing through a piston 16.

In the gas spring 13, the gas 5 enclosed within the piston-side chamber 8A flows into the rod side chamber 8B, during the compression phase, and through the cylinder grooves 15, the inner orifice 17A and the outer orifice 17B, so that little or no damping force occurs. In the extending process, since a lip 18 is provided on the piston 16 and blocks the outer orifice 17B, the gas 5 within the rod-side chamber 8B flows into the piston-side chamber 8A through the cylinder grooves 15 and the inner orifice 17A, so that an extension damping force occurs. When the gas spring 13 has been fully extended at the end of the extending process, the piston 16 comes to an position (airlock area) where no cylinder groove is formed, to define an airlock chamber with the gas seal 7 provided at the opening end of the cylinder 14, with a rod guide 19 and the piston 16. The fully extended gas spring 13 is damped (air-locked) only by the flow resistance of the gas 5 flowing through the inner orifice 17A.

Also known is a gas spring of another type, having cylinder grooves on the inner surface of the cylinder (second prior art), configured to allow a gas (air) to escape from the rod-side chamber to the piston-side chamber when the piston has been fully extended after rushing into the airlock area, without such an inner orifice 17A as is formed in the piston 16 of the above gas spring 13, through an eccentric clearance between a hard piston-ring and the inner surface of the cylinder, the piston ring being made from resin such as Teflon (trademark of Dupon Co., Ltd.) or Juranex (trademark of Polyplastic Co., Ltd.) and set in the outer edge of the piston.

However, the following shortcomings are present in the above two prior art examples. In the gas spring 13 (first prior art) shown in FIG. 17, the diameter of the inner orifice 17A through the piston 16 must be set to be a very small sectional area of 0.5 mm or less, so that the manufacturing step of boring causes difficulties, thus lowering the productivity of the piston 16 and the gas spring 13.

In the gas spring of the second prior art, since the eccentric clearance between the inner surface of the cylinder and the outer edge of the piston-ring is used instead of the orifice, the eccentric clearance being generated spontaneously when manufacturing the cylinder and the piston ring, non-uniformity of the eccentric clearance cause non-uniformity of the air-lock characteristics, thus making the gas spring unstable.

SUMMARY OF THE INVENTION

The present invention has been made in consideration of the above problems and an object thereof is to provide a gas spring capable of obtaining uniform, stable airlock characteristics, and capable of facilitating the manufacturing process and reducing the cost.

In the present invention, there is provided a gas spring in which: seal and guide members are arranged in an opening provided at one end of a cylinder enclosing a gas therein, the other end of the cylinder being closed; a rod having a piston at one end thereof is slidably arranged within the cylinder together with the piston through the seal and guide members, the cylinder being divided by the piston into a rod-side chamber and a piston-side chamber; force applying means is provided within the cylinder to force the rod in an extending direction; an annular passage is formed between the inner surface of the cylinder and the outer edge of the piston to communicate between the chambers provided at both sides of the piston, an annular groove is formed around the outer piston, and seal means is attached to the annular groove, the seal means having a check function for opening the annular passage only in a compressing process; a cylinder groove is formed in an axial direction of the cylinder throughout the range of piston stroke except an area nearby an extension end, and thereby extension damping force occurs while the gas flows from the rod-side chamber through the cylinder groove into the piston-side chamber in an extending process; and an airlock chamber is definable among the piston, and the seal and guide members nearby the extension end of the cylinder so that damping operation can be performed when being fully extended at the end of the extending process, wherein the piston is made from a porous material to communicate between the chambers provided at both sides of the piston.

In the invention, the porous piston material is made from sintered alloy, and formed as a body.

The seal means having the check function is an O ring.

The cylinder groove is formed within the axial direction of the cylinder throughout the range of piston stroke except the extension end so that damping force can occur in the extending process, and open pores of the porous piston, made from a porous material, are used as a passage for letting air escape from an airlock chamber to the piston-side chamber, the airlock chamber being formed in the rod-side chamber when the gas spring has been fully extended, thereby obtaining a uniform, stable airlock characteristic.

Further, no very small sized orifices need be formed through the piston, so that the piston becomes easy to make, thereby improving productivity and reducing the cost of manufacture.

Since the piston is porous being made from a porous sintered alloy, the density of the porous piston can be readily changed by changing the weight of sintered powder or the amount of force to be applied during powder molding, thereby producing different airlock characteristics.

Since the piston is formed as a body, parts such as washers are not required for forming a flange at one side of the annular groove, and the number of parts and manufacturing processes for the piston can be reduced, thereby reducing the cost.

Since the seal means having the check function uses an elastic O-ring, the O-ring can be easily set in the annular groove around the outer piston, even if the piston is formed as a body, by stretching and extending the O-ring.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings:

FIG. 13 is a graph of flow-rate characteristics plotted for each piston density, showing the relationship between the air pressure and the air outflow rate in the gas spring of FIG. 12;

FIGS. 14A to 14C are diagrams showing a conventional gas spring of inverted force type, in which FIG. 14A is a plan view showing a state when being mounted, and FIGS. 14B and 14C are sectional views;

FIGS. 15A and 15B are diagrams showing a conventional gas spring of inverted position turning type, in which FIG. 15A is a plan view showing a state when being mounted, and FIG. 15B is a sectional view;

DESCRIPTION OF THE PREFERRED EMBODIMENTS

Figure 1:
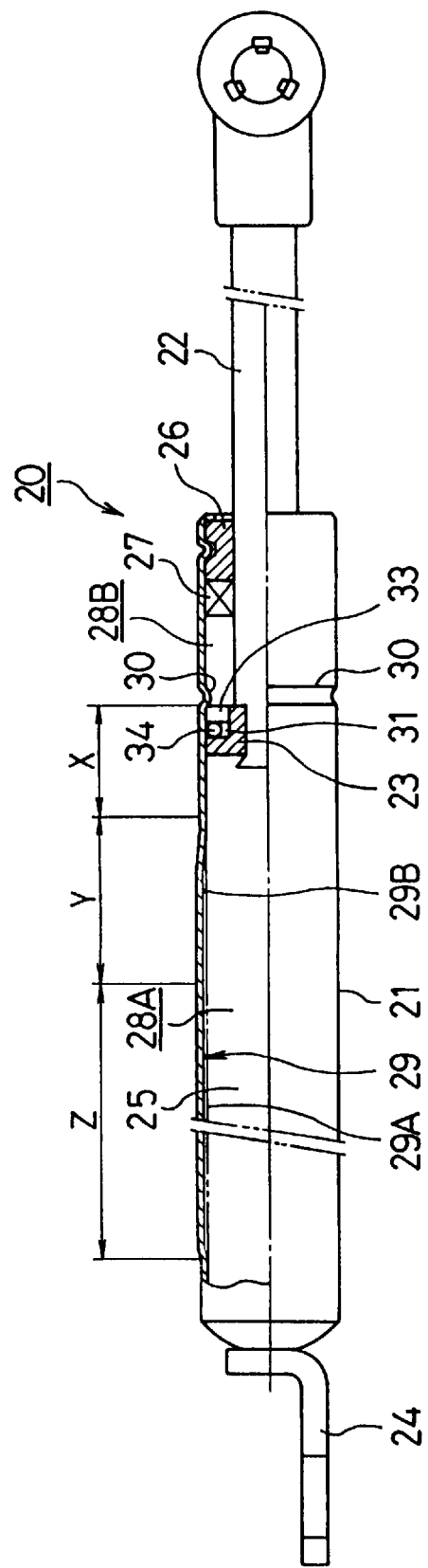
FIG. 1 is a partial sectional-view showing an embodiment of a gas spring according to the present invention.

FIG. 1 shows a gas spring 20 used for a four-wheel vehicle. The gas spring 20 has a piston 23 slidably within a cylinder 21, one end of the cylinder 21 is closed and the piston is fixed by applying pressure to one end of a rod 22. A bracket 24 of the cylinder 21 is attached to the car body, while the other end of the rod 22 is attached to a back hatch door.

Gas or air 25 is enclosed within the cylinder 21, and a rod guide 26 and gas seal 27 are arranged in an opening portion provided at the other end of the cylinder 21. The rod guide 26 permits the rod 22 to move as the piston 23 slides through the cylinder 21, while the gas seal 27 prevents a leakage of air. A very small amount of oil is also enclosed within the cylinder 21 so that the gas seal 27 can be lubricated sufficiently to maintain good sealing characteristics.

The cylinder 21 is divided by the piston 23 into two sections, one is a rod-side chamber 28B in which the rod 22 is housed and the other is a piston-side 28A chamber in which the rod 22 does not extend. The air 25 is enclosed in both the chambers 28A and 28B. There is no difference in air pressure (reaction force of the air) between the piston-side chamber 28A and the rod-side chamber 28B, but the piston-side chamber 28A has a pressure-receiving area of the piston 23 larger by a sectional area of the rod 22 than the rod-side chamber 28B. For this reason, the reaction force of the air within the piston-side chamber 28A acts as a force (assisting force) to move the piston 23 in an extending direction of the gas spring 20, i.e., the air 25 serves as force applying means.

Figure 2:
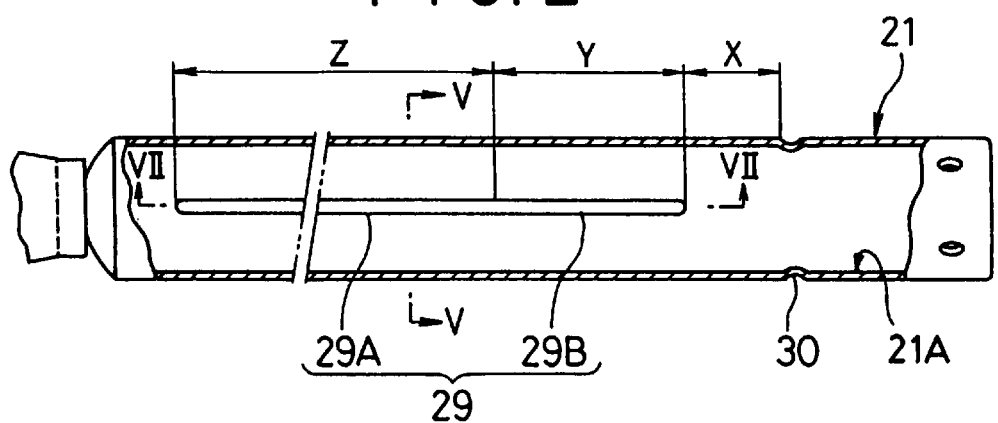
FIG. 2 is a sectional view showing a cylinder of FIG. 1.

As shown in FIGS. 1 and 2, a cylinder groove 29 is formed on the inner surface 21A of the cylinder 21. The cylinder groove 29 is formed by externally deforming the inner surface of the cylinder 21 using plastic working such as roll forming. In the cylinder 21, a stopper 30 is also provided nearby the position where the rod guide 26 and the gas seal 27 are located, to reduce the diameter of the cylinder 21 centrally. The piston 23 strikes the stopper 30 and stops moving forward under control of the stopper 30. The piston 23 strikes the stopper 30 when extended. The cylinder groove 29 is formed to extend in the axial direction of the cylinder 21 substantially throughout the full range of piston 23 stroke except in an area nearby the extension end.

One end of the cylinder groove 29, on the closed-end side of the cylinder 21, extends from the position where an O-ring 34 is located, when the gas spring 20 is most compressed. The O-ring 34 being used as a seal member and set in the outer edge of the piston. The O-ring 34 divides the cylinder 21 into the chambers 28A and 28B provided at both sides of the piston 23 and communicates between the chambers 28A and 28B through cylinder groove 29 even when the gas spring 20 is most compressed. The cylinder groove 29 may be extended to the closed end of the cylinder 21.

Figure 3:
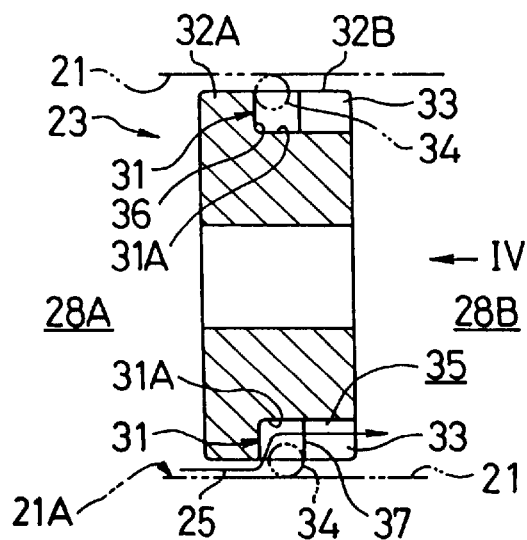
FIG. 3 is a sectional view showing a piston of FIG. 1.
Figure 4:
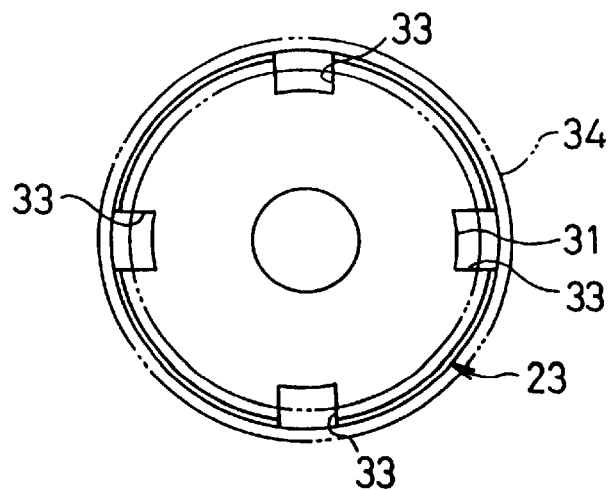
FIG. 4 is a diagram showing the piston of FIG. 3 as viewed from the plane indicated by the arrow IV.
Figure 5:
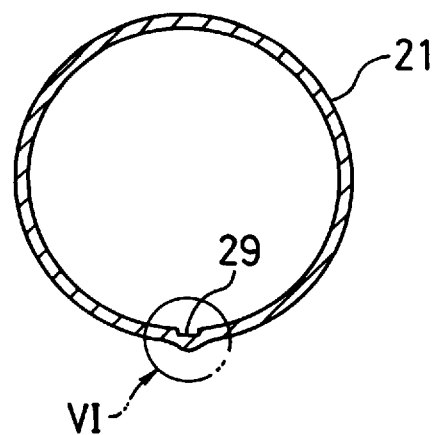
FIG. 5 is a sectional view taken along the plane of line V—V of FIG. 2 showing the cylinder that has rotated 90 degrees.
Figure 6:
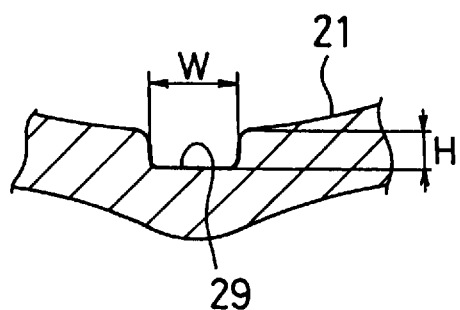
FIG. 6 is an enlarged sectional-view showing the portion VI of FIG. 5.
Figure 7:
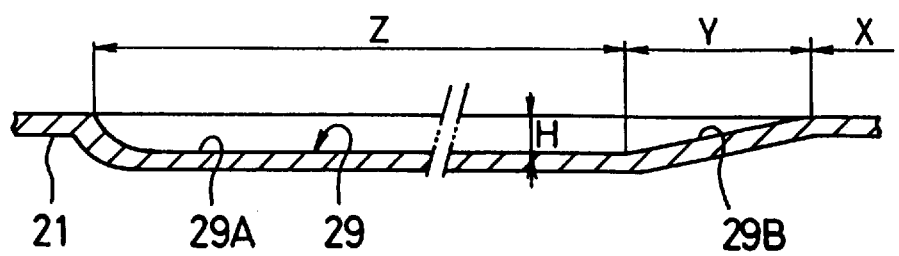
FIG. 7 is a sectional view taken along the plane of line VII—VII of FIG. 2.

As shown in FIGS. 3 and 4, an annular groove 31 is formed in the piston 23 by cutting so that the outer edge of the piston 23 will be divided into a first flange 32A and a second flange 32B. A pluality of notches 33 are avially formed on the second flange 32B so that the annular groove 31 and the rod-side chamber 28B can communicate with each other. The annular groove 31 is formed between the first flange 32A and a remaining portion of the second flange 32B in which the notch 33 is not formed. The O-ring 34 is then set in the annular groove 31 and used as an elastic seal member.

The O-ring 34 is in close contact with the inner surface of the cylinder 21 and is set in the annular groove 31 so that a clearance is left between the O-ring 34 and the bottom 31A of the annular groove 31. As a result, a passage 35 is defined the along outer edge of the first flange 32A of the piston 23, the annular groove 31, the notch 33 and the inner surface of the cylinder 21. The O-ring 34 serves as a check valve, which strikes the wall 36 of the first flange 32A to close the passage 35 in the process of extending the gas spring 20. It strikes the wall 37 of the second flange 32B to open the passage 35 in the process of compressing the gas spring 20.

When the gas spring 20 is extended, the passage 35 of the piston 23 is closed by the O-ring 34, and the air 25 of the rod-side chamber 28B flows into the piston-side chamber 28A only through the cylinder groove 29, so that extension damping force is generated by a flow resistance caused when the air 25 passes through the cylinder groove 29. In the process of extending the gas spring 20, the assisting force acts on the piston 23 and the rod 22 by reaction force of the air caused into the piston-side chamber 28A to move the piston 23 and the rod 22 in the extending direction. At this time, the extension speed of the piston 23 and the rod 22 is properly controlled by the extension damping force.

When the gas spring 20 is compressed, the passage 35 of the piston 23 is opened, and the air 25 within the piston-side chamber 28A flows into the rod-side chamber 28B through both the passage 35 and the cylinder groove 29, so that little or no damping force occurs in this compressing process, thus compressing the gas spring 20 quickly.

As shown in FIG. 2, the cylinder groove 29 is formed substantially throughout the full range of piston 23 stroke except at a position near the stopper 30 (the position without cylinder groove 29). The area near the stopper 30 of the piston 23 is an airlock area X. The cylinder groove 29 is constituted, as shown in FIGS. 5 through 8(A), by connecting two sections 29A and 29B, one section 29A being formed into a square groove having a square cross-section with constant width W and depth H. The other section 29B is tapered off toward the airlock area X of the piston 23. In the cylinder 21, the area corresponding to the section 29A which has a constant groove-depth H is used as an air damping area Z, while the area corresponding to the section 29B, the groove-depth H of which is tapered, is used as an air-damping reduction area Y.

In the process of extending the gas spring 20, when the piston 23 is in the air damping area Z, the rod 22 and the piston 23 move in the extending direction due to an action of the assisting force (reaction force of the air) from the piston-side chamber 28A, and the extension speed is controlled by the extension damping force caused by air passing into the cylinder groove 29.

Further, in the process of extending the gas spring 20, when the piston 23 is in the airlock area X, the piston 23, the O-ring 34, the cylinder 21, the gas seal 27 and the rod guide 26 define an airlock chamber to move the piston 23 in the extending direction very slowly, described later, thus performing properly damping operation when the gas spring 20 has been fully extended.

Figure 9:
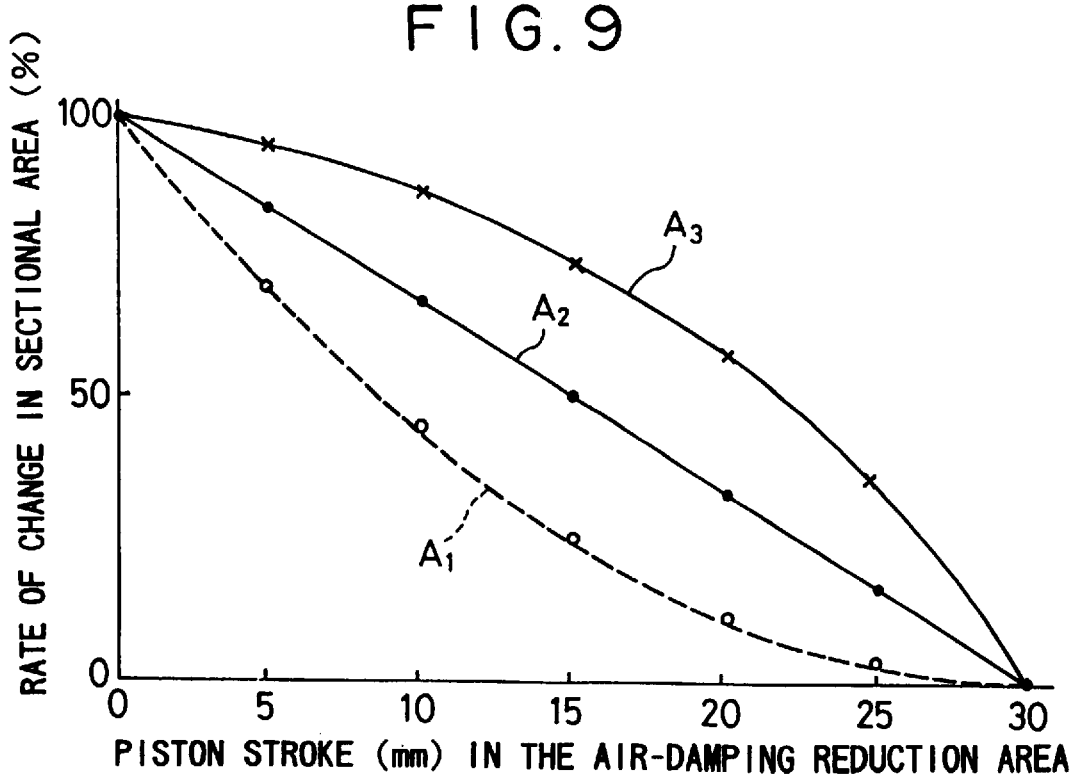
FIG. 9 is a graph showing the relationship between the rate of change in sectional area of the cylinder groove and the piston stroke in an air-damping reduction area.

Furthermore, in the process of extending the gas spring 20, when the piston 23 is in the air-damping reduction area Y, the sectional area of the cylinder groove 29 (29B) is reduced primarily in proportion to only the depth of the cylinder groove 29 (29B), as indicated by the solid curve $A_2$ in FIG. 9. For this reason, the piston 23 does not decelerate suddenly when the piston 23 rushes from the air damping area Z into the air-damping reduction area Y, as compared with the conventional gas spring which has V-shaped cylinder grooves.

Figure 8A:
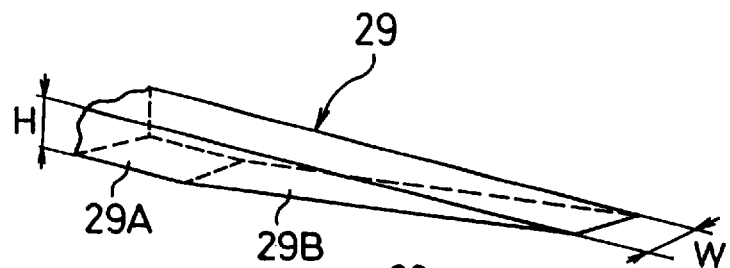
FIGS. 8A and 8B are perspective views showing a cylinder groove schematically.
Figure 8B:
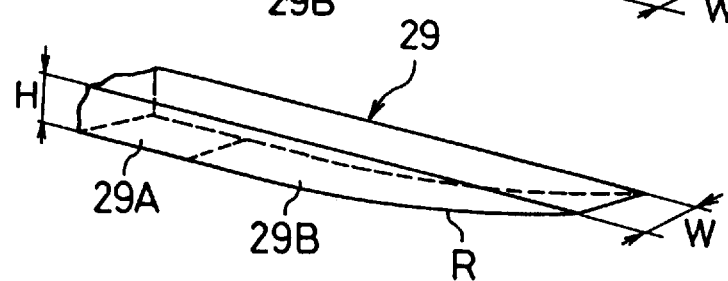
Figure 10:
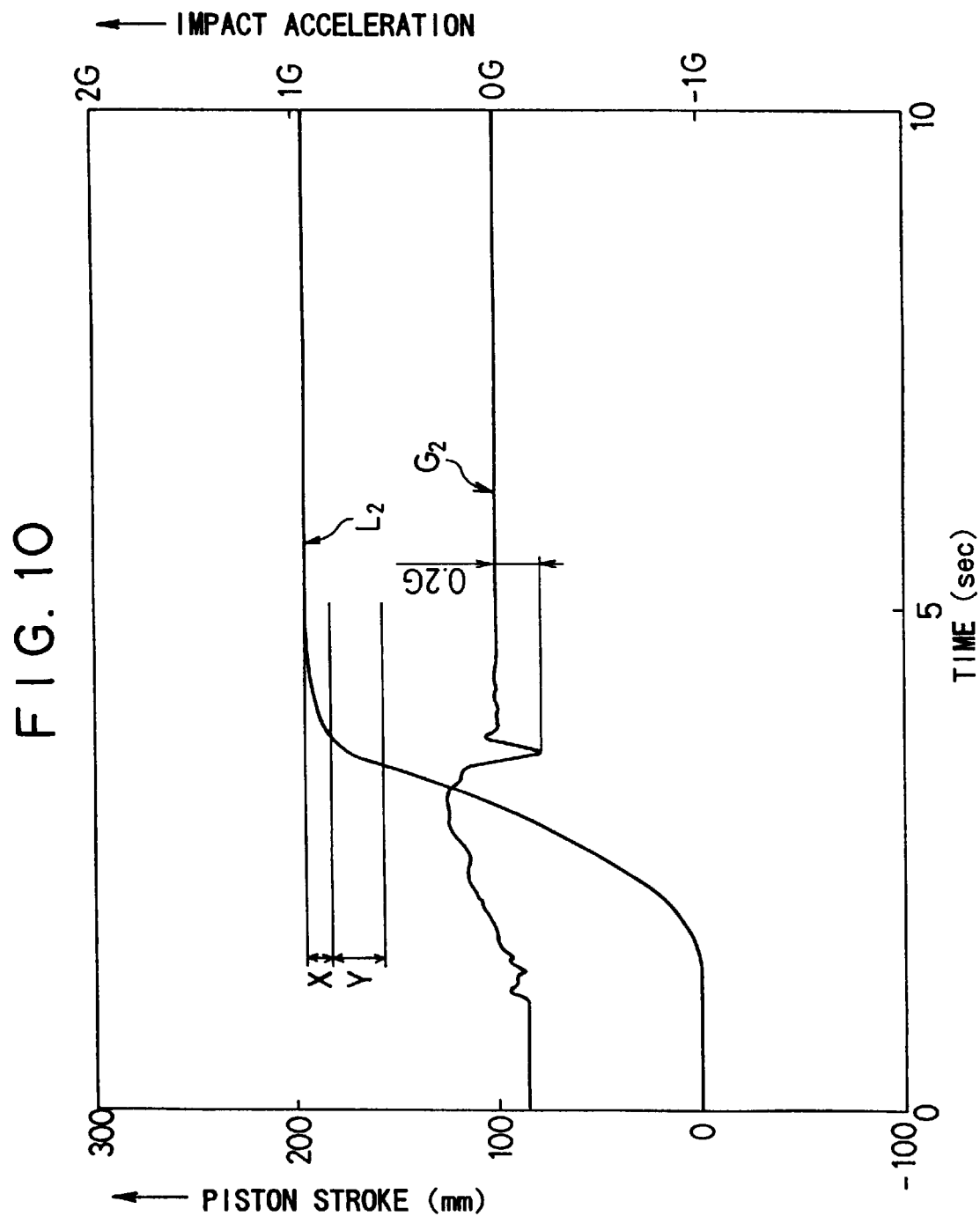
FIG. 10 is a graph showing the relationship between piston stroke, impact acceleration and time.

The cylinder groove 29 (29B) in the air-damping reduction area Y of the gas spring 20 may be formed, as shown in FIG. 8B, with the groove depth H tapered while bending toward the airlock area X along the axial direction of the cylinder 21 (bend R in FIG. 8B). In this case, since the sectional area of the cylinder groove 29 (29B) of the gas spring 20, which is in the air-damping reduction area Y, varies (decreases) with ⅔ power in the process of extending the gas spring 20, as indicated by the solid curve $A_3$ in FIG. 9, when passing from the air damping area Z to the air-damping reduction area Y, the piston 23 is slowed down more gradually than the case indicated by the solid curve $A_2$. As indicated by the piston stroke $L_2$ in FIG. 10, when passing from the air damping area Z to the air-damping reduction area Y, the piston 23 is decelerated while tracing a smooth curve in the air-damping reduction area Y, and thereby the impact acceleration $G_2$ of the gas spring 20 that acts on the back door is reduced to 0.2 G or less.

Figure 12:
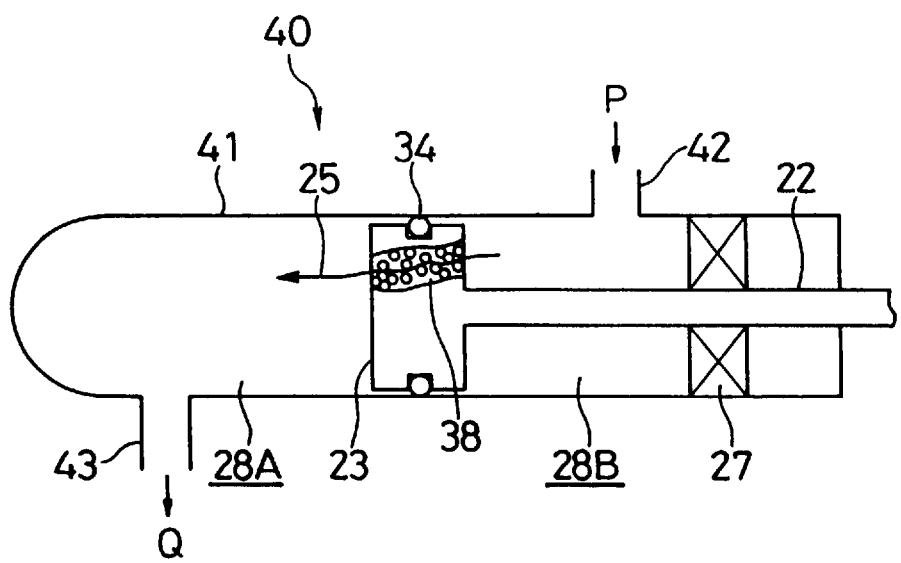
FIG. 12 is a schematic diagram showing a gas spring, which is used to determine the piston density of the gas spring of FIG. 1.
Figure 14C:
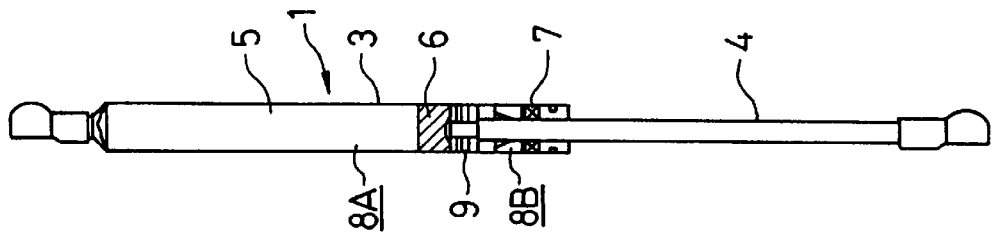
Figure 14B:
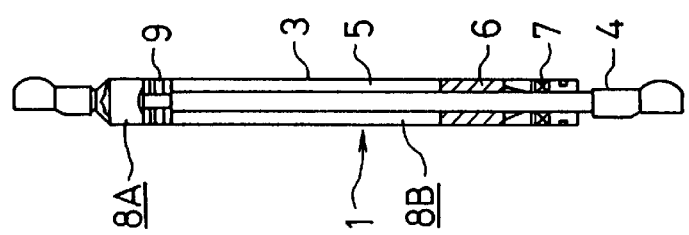
Figure 14A:
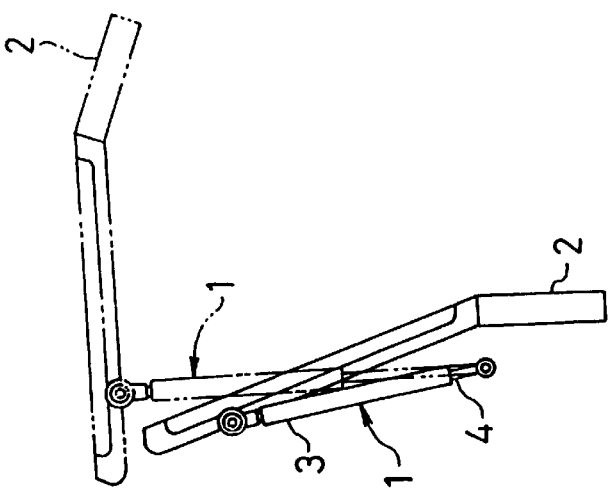
Figure 15A:
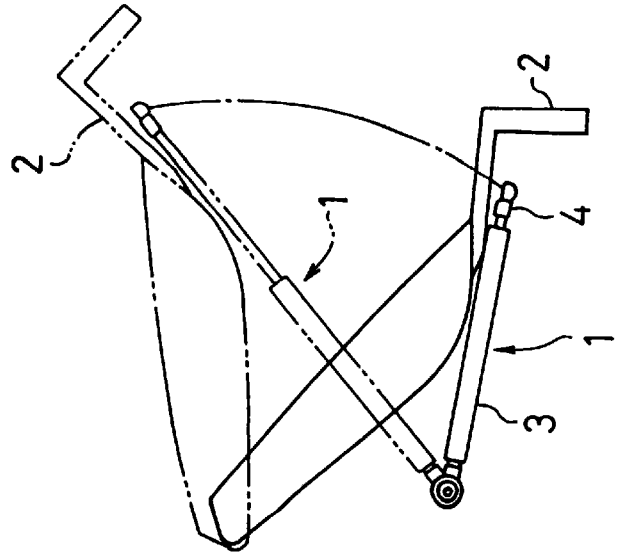
Figure 15B:
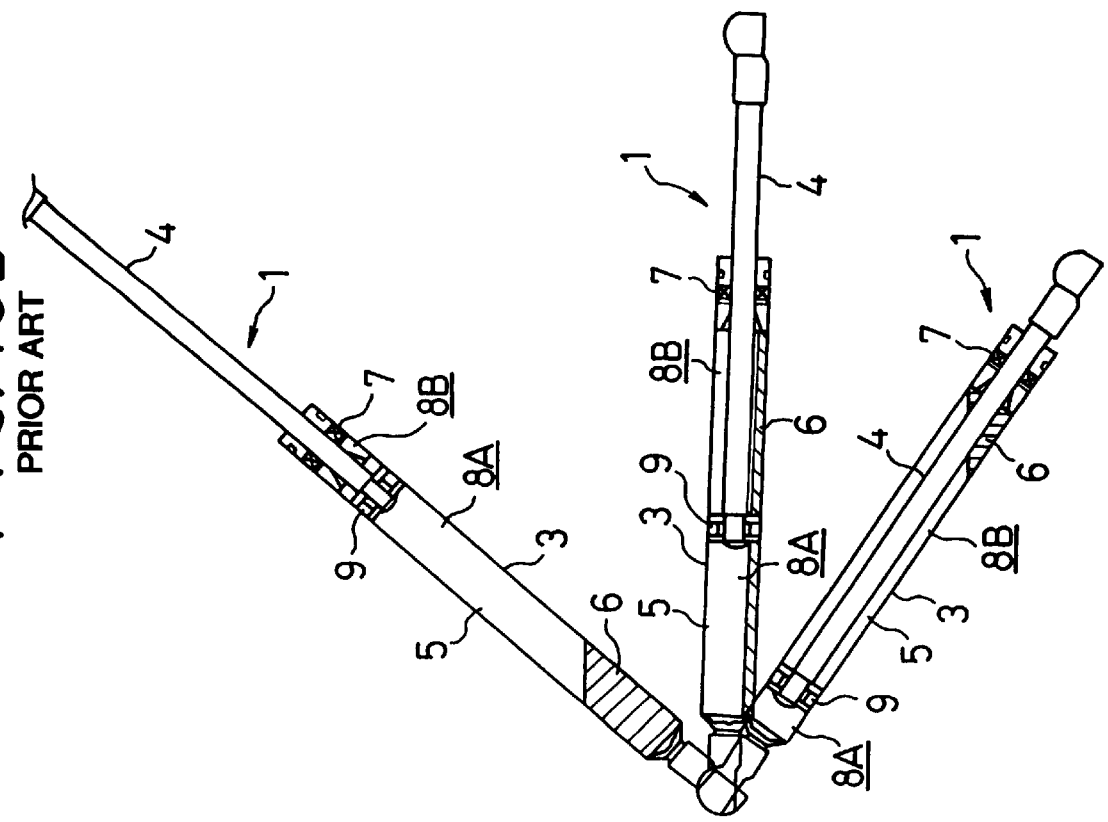
Figure 16A:
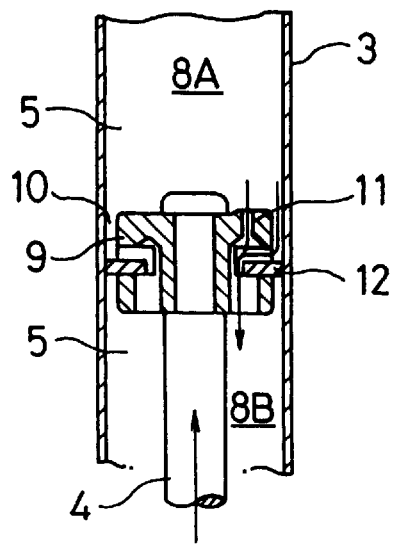
FIGS. 16A and 16B are partial sectional-views showing the gas springs of FIGS. 14A to 14C and FIGS. 15A and 15B, respectively.
Figure 16B:
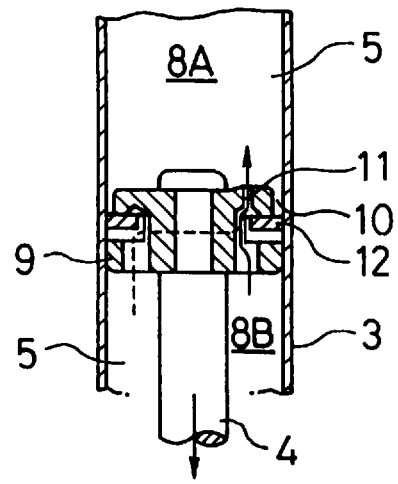
Figure 17:
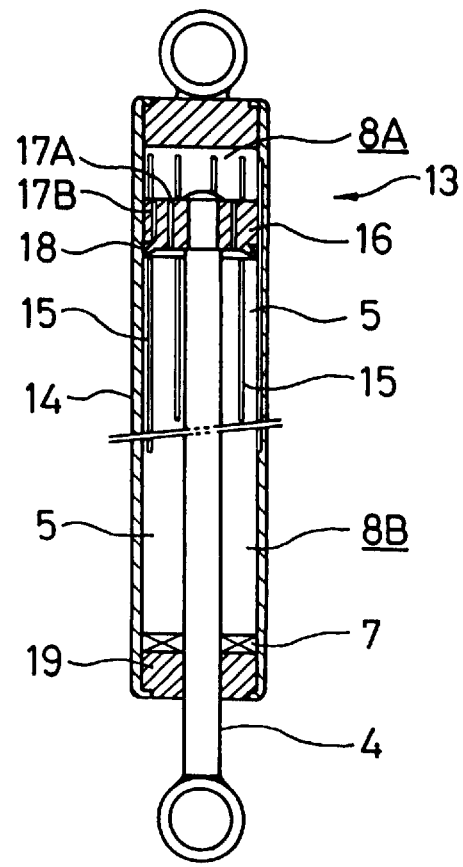
FIG. 17 is a sectional view showing a prior-art gas spring.

As shown in FIG. 12, the piston 23 is a solid-core member without any passage or orifice. It is made from sintered alloy, such as an iron-sintered alloy, having open pores 38 for passing air between the piston-side chamber 28A and the rod-side chamber 28B (see FIG. 12). The open pores 38 are formed by controlling the density ρ of the sintered alloy. For example, when the inside diameter of the cylinder 21 is 16 mm, 20 mm or 25 mm, the density ρ of the iron-sintered alloy from which the piston 23 is made is set to 6.0±0.15 gr/cm³ in order to obtain the best airlock characteristic.

The density ρ is determined with a gas spring 40 shown in FIG. 12. The gas spring 40 includes a cylinder 41 which has an inlet 42 in the rod-side chamber 28B and an outlet 43 in the piston-side chamber 28A. When the air 25 is supplied to the inlet 42 under a pressure P (kgf/cm²), the air 25 passes through the open pores 38 of the piston 23 and the piston-side chamber 28A and flows out of the outlet 43 toward the outside of the cylinder 41 at a flow rate Q (1/min). As shown in FIG. 13, the above density ρ (6.0±0.15 gr/cm³) of the piston 23 has been determined by the flow-rate characteristic curve $M_1$, which is plotted such that, when the pressure P of the air 25 is 5 kgf/cm², the outflow rate Q of the air becomes 3.5±0.15 1/min.

In FIG. 13, a curve $M_0$ represents a flow-rate characteristic for the density ρ=5.8 gr/cm³, a curve $M_2$ represents a flow-rate characteristic for the density ρ=6.2 gr/cm³, a curve $M_3$ represents a flow-rate characteristic for the density ρ=6.45 gr/cm³, a curve $M_4$ represents a flow-rate characteristic for the density ρ=6.6 gr/cm³, and a curve $M_5$ represents a flow-rate characteristic for the density ρ=6.75 gr/cm³.

When the piston 23 enters the airlock area X in the process of extending the gas spring 20, since the O-ring 34 is closely in contact with the inner surface of the cylinder 21, the air 25 within the rod-side chamber 28B flows into the piston-side chamber 28A through the open pores of the sintered alloy piston 23. For this reason, the extension speed of the piston 23 becomes very low, as mentioned above, after the piston 23 has traveled into the airlock area X until being fully extended. When fully extended, the gas spring 20 is properly damped without rebound shock. Since the air in the airlock chamber is vented to the piston-side chamber 28A through the open pores of the sintered alloy piston 23, uniform, stable airlock characteristics are obtained.

Figure 11:
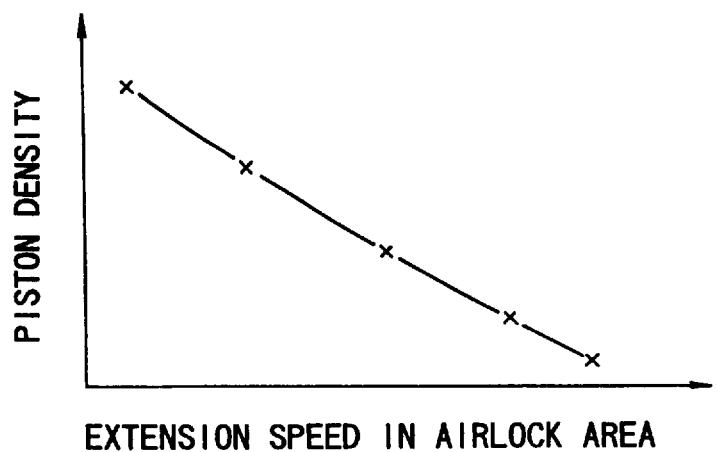
FIG. 11 is a graph showing the relationship between the piston density and the extension speed in an airlock area.

The density of the sintered alloy piston 23 can be changed to control the extension speed of the piston 23 in the airlock area X of the cylinder 21. In other words, the extension speed of the piston 23 can be set in the airlock area X to a desired value by specifying the density of the piston 23 because the extension speed of the piston 23 in the airlock area X of the gas spring 20 is in inverse proportion to the density of the piston 23, as shown in FIG. 11.

The above described embodiment has the following advantages (1) through (5).

(1) The cylinder 21 of the gas spring 20 includes: the cylinder groove 29 which is formed in the axial direction throughout the range of piston stroke except at the extension end so that damping force occurs in the extending process; and the open pores 38 of the porous material piston 23, which is used as a passage for escape of the air 25 from the airlock chamber in the rod-side chamber 28B to the piston-side chamber 28A when the gas spring 20 has been fully extended. Accordingly, a uniform, stable airlock characteristic is obtained.

(2) It is not necessary to form any orifice having a very small sectional area in the piston 23, so that the piston 23 becomes easy to make, thereby improving productivity and reducing the cost.

(3) Since the sintered alloy piston 23 is porous, the density ρ can be easily changed by changing the weight of sintered powder or the amount of force to be applied during powder molding, thereby obtaining desired airlock characteristics.

(4) Since the piston 23 is formed as a body, additional parts such as washers are not required for forming the second flange 32B at one side of the annular groove 31 of the piston 23, so that the number of parts and manufacturing steps can be reduced, thereby reducing the cost.

(5) Since the seal means having the check function uses an elastic O-ring 34, the O-ring 34 can be easily set in the annular groove 31 around the outer piston 23, even if the piston 23 is formed as a body, by merely stretching and extending the O-ring 34.

Although the above embodiment described the case wherein the piston 23 is made from sintered alloy, the concept is not limited by the embodiment and any porous piston can be used as long as it has open pores 38 for communicating between the chambers 28A and 28B provided at both sides of the piston 23.

The above described embodiment also teaches that the reaction force of the gas occurs within the piston-side chamber 28A in the process of extending the gas spring 20 to generate the assisting force to the piston 23 and the rod 22, but the assisting force could also be directed to the piston 23 and the rod 22 by the force of a coil spring.

Further, the second flange 32B with the notch 33 may be formed separately from the piston 23. In this case, after the second flange 32B is removed and the O-ring 34 is set in the annular groove 31, the second flange 32B would be attached to the first flange 32A.

Furthermore, although the above embodiment described the gas spring 20 of inverted position turning type, the gas spring 20 may be also used as a gas spring of inverted force type.

As described above, according to the present invention, there is provided a gas spring capable of obtaining uniform, stable airlock characteristics, and capable of simply and low cost manufacture.

While the preferred embodiments of the invention have been described in detail with reference to the drawings, they are by no means limitative, and various changes and modifications are possible without departing from the scope and spirit of the invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A gas spring comprising:

a hollow cylinder having an inside surface and a longitudinal extent delimited by a closed end and an open end, said open end enclosed by a guide member and a seal arranged within said cylinder, said cylinder including a stopper spaced from said enclosed end, said stopper defined by an annular depression in said cylinder which reduces a diameter of the cylinder centrally, said seal and said guide members in abutment with each other with said seal nearer said stopper, said cylinder retaining a gas therein;

a rod having a piston at one end thereof and extendable through the seal and guide members, said rod slidably movable within the cylinder together with the piston, said piston having a piston stroke range defined as a longitudinal distance of piston movement between said closed end and said stopper, said stopper delimiting movement of said piston and rod, said piston dividing the cylinder into a rod-side chamber and a piston-side chamber, said retained gas simultaneously existing within both chambers, wherein movement of said piston from said stopper towards said closed end represents a compression phase of said spring and movement from said closed end to said stopper represents an extension phase, said extension phase comprised of a damping phase, a damping reduction phase, and an airlock phase, said cylinder including an axial groove formed therein, said groove having a pair of terminal ends, one of said ends in spaced relationship to said closed end and the other of said ends in spaced relationship to said stopper, said axial groove extending along the cylinder throughout the range of the piston stroke except in a stroke range corresponding to said airlock phase of said piston extension, wherein an end of said extension phase is represented by said piston contacting against said stopper, said airlock phase corresponding to piston movement along a longitudinal extent of said cylinder which extends between said stopper and said other terminal end of said axial cylinder groove;

said piston made from an air-permeable porous material having open pores therein and having an outer edge which includes an annular groove formed around the outer edge, thereby dividing the piston into a first and second flange, said second flange including at least one axially directed notch along said outer edge, said notch communicating with said annular groove, thereby creating a passageway for communicating gas between the chamber;

seal means inserted in the annular groove, the seal means having a check function for opening the passage only in the compression phase of said spring wherein gas is allowed to flow through said passage;

said axial cylinder groove providing an extension damping force during said extension phase, said extension damping force operative only when the seal means is adapted to allow the gas to flow from the rod-side chamber into the piston-side chamber, only through the cylinder groove, wherein said seal means is further adapted to allow the gas in the rod-side chamber to flow into the piston-side chamber only through said open pores of said piston when said piston enters said airlock phase, thereby producing a damping reduction of the piston.

2. The gas spring as set forth in claim 1, wherein the piston is made from a sintered alloy.

3. The gas spring as set forth in claim 2, wherein the sintered alloy is an iron-sintered alloy, and a density of said alloy is set to $6.0 \pm 0.15$ gr/cm$^3$.

* * * * *